(12) United States Patent
Schneider (10) Patent No.: US 9,308,883 B1
(45) Date of Patent: Apr. 12, 2016

(54) LOW-VOLUME SEAT-MOUNTED AIRBAG WITH KNEE RESTRAINT

(71) Applicant: Autoliv ASP, Inc., Ogden, UT (US)

(72) Inventor: David W. Schneider, Waterford, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/659,191

(22) Filed: Mar. 16, 2015

(51) Int. Cl.
  *B60R 21/231* (2011.01)
  *B60R 21/207* (2006.01)
  *B60R 21/2338* (2011.01)

(52) U.S. Cl.
  CPC .............. *B60R 21/231* (2013.01); *B60R 21/207* (2013.01); *B60R 21/2338* (2013.01); *B60R 2021/23153* (2013.01); *B60R 2021/23169* (2013.01); *B60R 2021/23382* (2013.01); *B60R 2021/23386* (2013.01)

(58) Field of Classification Search
  CPC ................ B60R 21/231; B60R 21/207; B60R 2021/23153; B60R 2021/23169; B60R 21/2338; B60R 2021/23382
  USPC ................................................ 280/730.1, 732
  See application file for complete search history.

(56) References Cited

U.S. PATENT DOCUMENTS

| | | | |
|---|---|---|---|
| 3,784,225 A | | 1/1974 | Fleck et al. |
| 5,344,184 A | | 9/1994 | Keeler et al. |
| 5,738,368 A | | 4/1998 | Hammond et al. |
| 8,622,417 B1 | * | 1/2014 | Schneider et al. ............ 280/729 |
| 2004/0174003 A1 | * | 9/2004 | Dominissini ................. 280/729 |
| 2011/0031722 A1 | * | 2/2011 | Baumann et al. .......... 280/728.1 |
| 2012/0193896 A1 | | 8/2012 | Turnbull et al. |
| 2013/3741975 | | 12/2013 | Schneider et al. |
| 2014/0210193 A1 | * | 7/2014 | Co et al. ........................ 280/735 |

FOREIGN PATENT DOCUMENTS

| | | | |
|---|---|---|---|
| DE | 10001658 A1 | 9/2000 | |
| DE | 19916848 A1 | 10/2000 | |
| WO | WO 2008095615 A1 * | 8/2008 | .... B60R 2021/23153 |

* cited by examiner

Primary Examiner — Faye M Fleming
(74) Attorney, Agent, or Firm — Stoel Rives LLP (57) ABSTRACT

A low-volume airbag can deploy from a seat back to cushion an occupant disposed rearward of the seat during a collision event. The low-volume airbag can deploy from the seat at a position that is level with or lower than the position of the occupant's knees. When deployed, the low-volume airbag may adopt a curved or bent configuration. The low-volume airbag can be shaped and positioned to receive the head and/or torso of the occupant during a collision event. Cushioning of the knees of an occupant during a collision event may also be provided.

21 Claims, 10 Drawing Sheets

LOW-VOLUME SEAT-MOUNTED AIRBAG WITH KNEE RESTRAINT

TECHNICAL FIELD

The present disclosure relates generally to the field of protection systems for vehicle occupants. More particularly, the present disclosure relates to airbag assemblies for back-seat occupants that include both an airbag cushion for receiving the head of a back-seat occupant and a knee restraint that deploys toward knees of the back-seat occupant as a result of inflation of the airbag cushion.

BACKGROUND

Protection systems have been installed in vehicles to protect an occupant during a collision event. Some protection systems suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Occupant protection systems, such as airbag assemblies, may be installed at various locations within a vehicle to reduce or minimize occupant injury during a collision event. In the following disclosure, specific reference is made to airbag assemblies that are designed to deploy from the back of a seat (i.e., a seat back) to cushion a back-seat occupant of a vehicle, although the principles discussed herein may apply to airbag assemblies that are designed to cushion other occupants as well, such as occupants seated in a front seat of a vehicle.

Airbag assemblies generally include an airbag cushion. The airbag cushion is typically disposed within a housing in a packaged state (e.g., rolled, folded, and/or otherwise compressed) and may be retained in the packaged state behind a cover. During a collision event, an inflator may be triggered, which rapidly fills the airbag cushion with inflation gas. The inflation gas may cause the airbag cushion to rapidly transition from a compact packaged (i.e., un-deployed) state to an expanded or deployed state. In some embodiments, the expanding airbag cushion opens an airbag cover (e.g., by tearing through a tear seam or opening a door-like structure) to exit the housing. The inflator may be triggered by any suitable device or system, and the triggering may be in response to and/or influenced by one or more vehicle sensors.

Airbag assemblies can also include a knee restraint to protect the knees and/or lower leg of an occupant during a collision event. Such knee restraints may absorb at least some of the impact energy of an occupant during a collision event. In some embodiments, the knee restraint may comprise or consist of a portion of an airbag cushion that contacts and cushions the knees of an occupant during a collision event. In other or further embodiments, the knee restraint may include a panel that is configured to be pushed toward the one or more knees of the occupant by the airbag cushion as the airbag cushion is inflated.

Some of the airbag assemblies disclosed herein may be particularly useful for protecting occupants who are seated rearward of the front seats of a vehicle. For example, in some embodiments, the airbag assemblies include an airbag cushion that is deployed from a seat immediately in front of the occupant at a relatively low position. For instance, the airbag cushion may deploy from a seat back at a position that is level with or lower than the position of the knees of an occupant who is seated in a back seat. In other embodiments, the airbag cushion, in addition to deploying in a generally upward direction, may include a knee restraint portion that deploys downward to position at or below the position of the knees of a back-seat occupant. The airbag cushion, when deployed, may adopt a curved or bent shape when inflated. For example, the inflated airbag cushion may be shaped such that a cross-section of the airbag cushion that is parallel to the sagittal plane of a back-seat occupant, when the occupant is seated in the back-seat vehicle occupant position, is substantially U-shaped. More particularly, the sagittal plane of the back-seat occupant, when seated in the back-seat vehicle occupant position, intersects the airbag cushion to form a cross-section of the airbag cushion that includes a generally U-shaped portion. Stated differently, the inflated airbag cushion may include a first portion that extends generally upward from an airbag housing and a second portion that is disposed distal of the first portion and that bends or curves back on the first portion. In some embodiments, the distal portion extends primarily downward. In other embodiments, the distal portion extends primarily forward relative to the vehicle. The airbag cushion may present a first surface that is configured to receive the head of the occupant during a collision event and a second surface that is disposed opposite the first surface.

In some of the embodiments disclosed herein, the airbag cushion is a low-volume airbag cushion. Such low-volume airbag cushions may be configured to expand to a three-dimensional shape that curves or bends around empty space. Stated differently, the airbag cushion, when inflated, may double over to form an empty space between a proximal portion of the airbag cushion and a distal portion of the airbag cushion. Due to the curved and/or bent shape of the low-volume airbag cushion, the low-volume airbag cushion may require less gas for inflation than a conventional airbag cushion to fill the same space effectively occupied by the lower-volume airbag cushion.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The terms "connect" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrase "attached to" refers to interaction between two or more entities that are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

As used herein, the terms "forward" and "rearward" are used with reference to the front and back of the relevant vehicle. For example, an airbag cushion that deploys in a rearward direction deploys toward the back of a vehicle.

The directional terms "proximal" and "distal" are used herein to refer to opposite locations on an airbag cushion. The proximal end of an airbag cushion is the end of the airbag cushion that is closest to the inflator when the airbag cushion is fully inflated. The distal end of an airbag cushion is the end opposite the proximal end of the airbag cushion. In other words, the terms "proximal" and "distal" are with reference to a point of attachment, such as a point of attachment of the airbag cushion at an airbag assembly housing and a point of attachment of an airbag assembly at a seat back from which an airbag deploys. Specifically, "proximal" is situated toward such point of attachment and "distal" is situated away from such point of attachment.

The term "back seat," as used herein, refers to any seat that is disposed rearward of the front seat(s) of a vehicle, regardless of whether the seat is the most rearward seat in the vehicle. The term "back seat" also refers to any seat that is disposed rearward of other back seats.

The "vehicle occupant position" is the position in which an occupant is generally positioned when seated in a back seat of a vehicle.

The term "U-shaped," as used herein, refers to any U-shaped or V-shaped configuration, regardless of the direction in which the arms of the "U" or "V" are oriented. For example, an airbag cushion may be U-shaped if the arms of the U or V extend downward (e.g., ∩, Λ) or to the side (e.g., ⊃, ⊂, <, >). Stated otherwise, the term "U-shaped" refers to any shape having a first portion extending in a first direction, a curve, fold, or turn back, and a second portion extending in a second direction.

The term "vehicle" may refer to any vehicle, such as a car, truck, bus, airplane, etc.

The term "occupant" generally refers to a person within a vehicle. The term "occupant" can also include a crash test dummy within a vehicle.

Figure 1A:
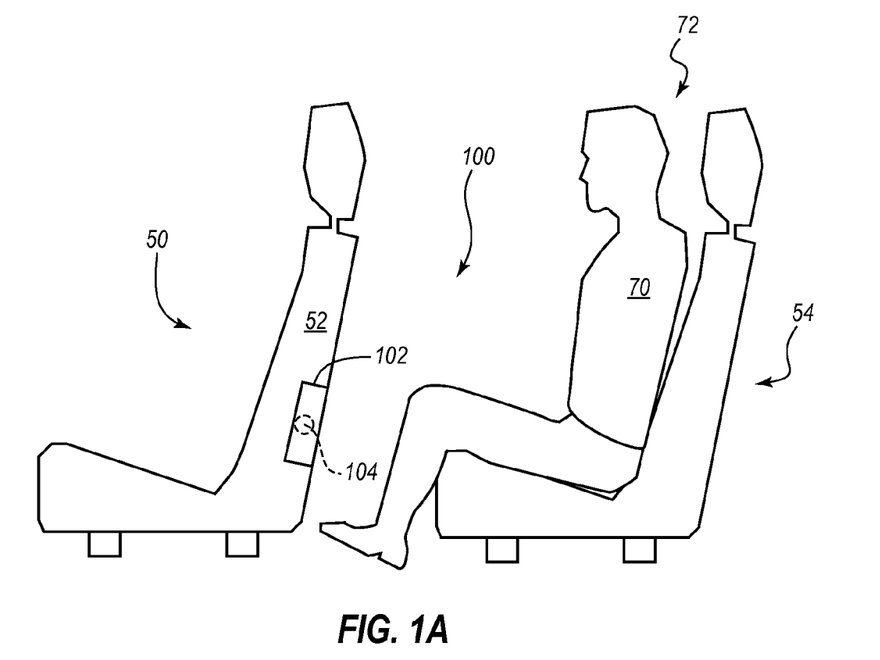
FIG. 1A is a side view of an un-deployed airbag assembly, according to one embodiment.
Figure 1B:
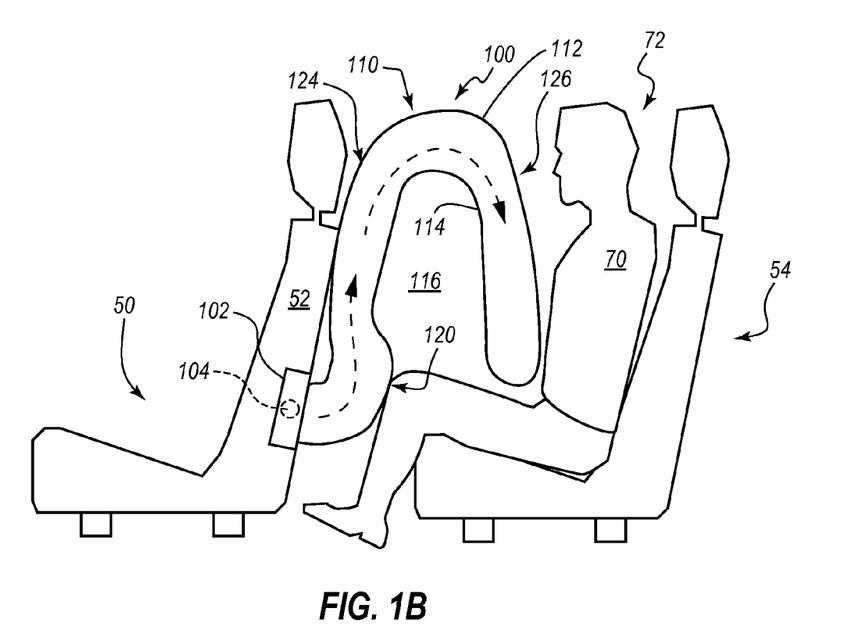
FIG. 1B is a side view of the airbag assembly of FIG. 1A in a deployed state.
Figure 1C:
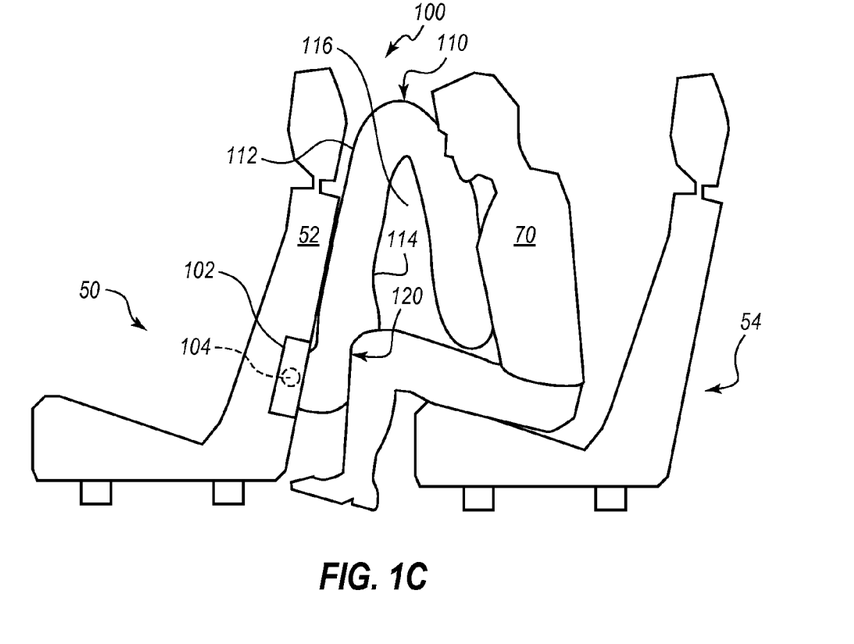
FIG. 1C is a side view of the airbag assembly of FIG. 1A depicting occupant loading onto a deployed airbag.
Figure 1D:
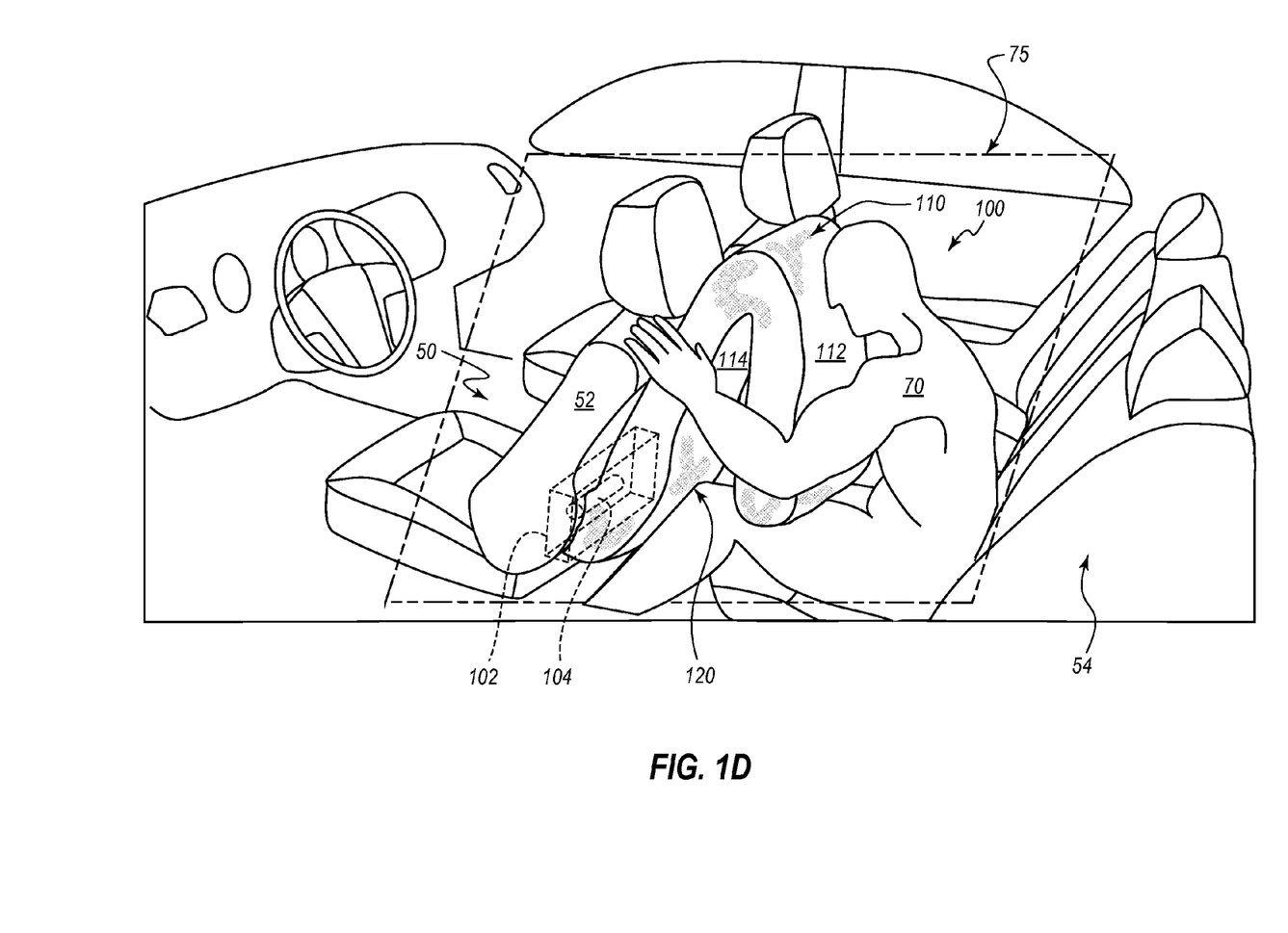
FIG. 1D is a perspective view of the airbag assembly of FIG. 1A depicting occupant loading onto a deployed airbag.

FIGS. 1A-1D depict an airbag assembly 100. More particularly, FIG. 1A provides a side view of the airbag assembly 100 in an un-deployed state. FIG. 1B provides a side view of the airbag assembly 100 in a deployed state. FIG. 1C provides a side view of the airbag assembly 100 upon occupant 70 loading. And FIG. 1D provides a perspective view of the airbag assembly 100 upon occupant 70 loading.

With reference to FIGS. 1A-1D, the airbag assembly 100 includes an airbag housing 102, an inflator 104, and an airbag cushion 110. In the depicted embodiment, the airbag housing 102 is within or attached (e.g., mounted) to the seat back 52 of a seat 50 that is disposed directly forward of a back-seat occupant 70. The airbag housing 102 may be disposed at a position that is level with or lower than the position of one or more knees of the occupant 70 when the occupant 70 is seated in a vehicle occupant position 72 in the back seat 54.

In the depicted embodiment, the inflator 104, which may be a single-stage inflator or a multi-stage inflator, is disposed within the airbag housing 102. In some embodiments, the inflator 104 is configured to release approximately 2 moles to 2.5 moles of inflation gas, and no more than 3 moles of inflation gas, into the airbag cushion 110. The inflator 104 may be disposed at a position that is level with or lower than the position of one or more knees of the occupant 70 when the occupant 70 is seated in the vehicle occupant position 72. Stated differently, the airbag cushion 110 may be coupled to the inflator 104 at a position that is below the position of the knees of the back-seat occupant 70.

During or in anticipation of a collision event, the inflator 104 may be triggered, releasing gas into the airbag cushion 110. Stated differently, the airbag cushion 110 may be configured to receive inflation gas from the inflator 104 to transition from a compact un-deployed state within the airbag housing 102 (see FIG. 1A) to an expanded deployed state (see FIG. 1B). In some embodiments, the airbag cushion 110 is configured to receive air from the inflator 104 to deploy from the airbag housing 102 at a position that is level with or lower than the position of a knee of a vehicle occupant 70 (e.g., a 50th percentile male crash test dummy) when the occupant 70 is seated in the vehicle occupant position 72. In other embodiments, the airbag cushion 110 may include a knee restraint portion that deploys generally downward from the housing to a position at or below the position of the knees of a back-seat occupant.

When fully deployed (as depicted in FIG. 1B), the airbag cushion 110 may be sized and shaped to cushion the head and/or torso of the back-seat occupant 70 during a collision event. For example, in the depicted embodiment, the airbag cushion 110 includes a first surface 112 that is configured to contact the face of an occupant 70 during a collision event (see FIGS. 1C and 1D). The first surface 112 extends from adjacent the airbag housing 102 to a distal end of the airbag cushion 110 when the airbag cushion 110 is fully inflated. The airbag cushion 110 also includes a second surface 114 disposed opposite the first surface 112 when the airbag cushion 110 is fully inflated. The second surface 114 of the airbag cushion 110, like the first surface 112 of the airbag cushion 110, extends from adjacent the housing 102 to the distal end of the airbag cushion 110 when the airbag cushion 110 is fully inflated. The first surface 112 and the second surface 114 of the airbag cushion 110 may, in some embodiments, cooperate to form the entire airbag cushion 110. In some embodiments, any point on the first surface 112 of the airbag cushion is disposed approximately 15 centimeters to approximately 20 centimeters, and no more than 30 centimeters, from a point on the second surface 114 when the airbag cushion 110 is fully inflated. In some embodiments, the first surface 112 and the second surface 114 are disposed between 15 centimeters and 20 centimeters apart. In some embodiments, the first surface 112 and the second surface 114 are disposed between 16 centimeters and 19 centimeters apart. In some embodiments, the first surface 112 and the second surface 114 are disposed between 17 centimeters and 18 centimeters apart.

As shown in FIGS. 1B and 1C, the second surface 114 of the airbag cushion 110 is configured to receive one or more knees of the occupant 70 during the collision event. Stated differently, in some embodiments, the first surface 112 of an airbag cushion 110 is configured to contact the head of the occupant 70 during a collision event, while the second surface 114 of the airbag cushion 110 is configured to contact and receive one or more knees of the occupant 70 during the collision event.

As depicted in FIGS. 1B-1D, the airbag cushion 110 may be configured to adopt a curved or bent shape when inflated. For example, the deployed airbag cushion 110 may be shaped such that the sagittal plane 75 of an occupant 70, when the occupant 70 is seated in the vehicle occupant position 72, intersects the airbag cushion 110 to form a cross-section of the airbag cushion 110 that includes a generally U-shaped portion. Stated differently, the cross-section of the airbag cushion 110 that is defined by the intersection of the sagittal plane 75 of the occupant 70 with the airbag cushion 110 may include a U-shaped portion. For instance, as depicted in FIGS. 1B-1D, the airbag cushion 110, when deployed, may be curved in a U-shape such that a proximal portion of the airbag cushion 110 extends upward along the seat back 52 and a distal portion of the airbag cushion 110 extends downward toward the lap of an occupant 70 who is seated in the vehicle occupant position 72. For the airbag assembly 100, the seat back 52 may provide a reaction surface for the airbag cushion 110, thereby limiting the forward movement of the airbag cushion 110 upon occupant impact.

In some embodiments, such as the airbag assembly 100 depicted in FIGS. 1A-1D, the inflated airbag cushion 110 is curved or bent such that a first portion 124 (FIG. 1B) of the airbag cushion 110 extends generally upward from the housing 102 and a second portion 126 (FIG. 1B) of the airbag cushion 110, which is disposed distal of the first portion, extends primarily downward relative to the vehicle.

The curved or bent shape of the inflated airbag cushion 110 may be accomplished by any suitable means. For example, in some embodiments, the airbag cushion 110 is made from curved or bent panels that cause the airbag cushion 110 to adopt a curved shape upon inflation. In other embodiments, the airbag cushion 110 is woven as a single piece into a particular (e.g., curved) shape. As will be described in greater detail below, the shape of the airbag cushion 110 may also be influenced by one or more tethers.

The curved or bent shape of the airbag cushion 110 may cause the airbag cushion 110 to at least partially surround an empty space 116. Although the airbag cushion 110 does not formally occupy this empty space 116, the curved shape of airbag cushion 110 effectively "occupies" or surrounds this space 116 by virtue of the curved structure of the airbag cushion 110. Stated differently, the airbag cushion 110 may be low-volume airbag cushion that requires less inflation gas than a traditional airbag cushion requires to formally fill the volume effectively occupied by the low-volume cushion. Such low-volume airbag cushions may sufficiently inflate with between 2 moles and 2.5 moles of inflation gas, and no more than 3 moles of inflation gas in order to be fully inflated.

The airbag assembly 100 may further include a knee restraint 120 that is configured to deploy toward and cushion one or more knees of the occupant 70 during a collision event. In the depicted embodiment, the knee restraint 120 is a portion of the airbag cushion 110 that is disposed adjacent the proximal end of the airbag cushion 110. This portion of the airbag cushion 110 receives and cushions the knees of the occupant 70 during a collision event. The knee restraint 120 may deploy toward one or more knees of the occupant 70 as a result of deployment of the airbag cushion 110 during the collision event.

The airbag assembly 100 depicted in FIGS. 1A-1D is sized and shaped to cushion a single back-seat occupant 70 during a collision event. However, other airbag assemblies may be sized and shaped to cushion two or more back-seat occupants during a collision event. For example, an airbag cushion that is configured to cushion two occupants may be approximately twice as wide as the airbag cushion 110 depicted in FIGS. 1A-1D. The airbag cushion may be configured to, upon deployment, also extend in a transverse direction across the vehicle to cushion two or more back-seat occupants during a collision event.

Figure 2A:
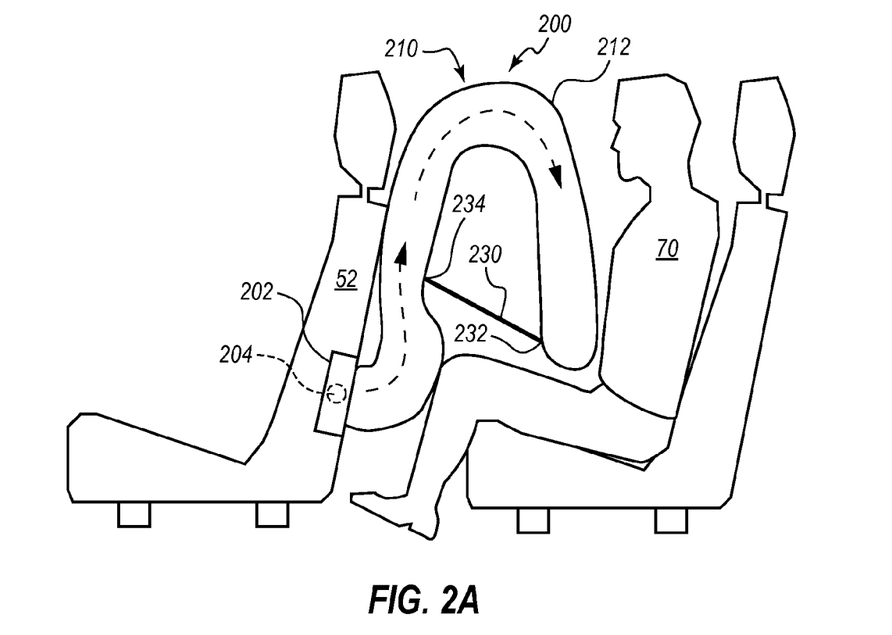
FIG. 2A is a side view of a deployed airbag assembly, according to another embodiment.
Figure 2B:
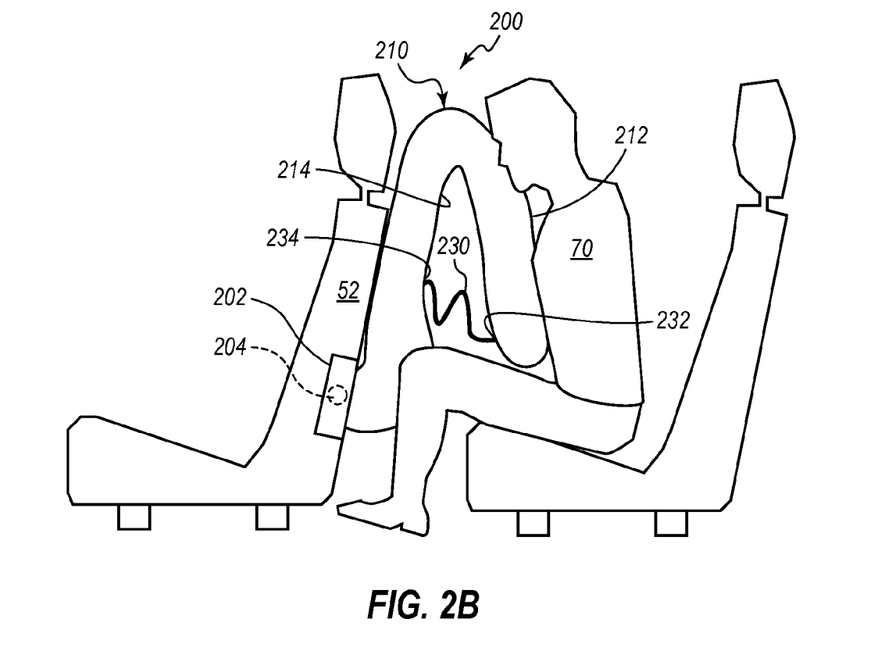
FIG. 2B is a side view of the deployed airbag assembly of FIG. 2A depicting occupant loading onto a deployed airbag.

FIGS. 2A-2B depict an embodiment of an airbag assembly 200 that resembles the airbag assembly 100 described above in certain respects. Accordingly, like features are designated with like reference numerals, with the leading digits incremented to "2." For example, the embodiment depicted in FIGS. 2A-2B includes an airbag cushion 210 that may, in some respects, resemble the airbag cushion 110 of FIGS. 1A-1D. Relevant disclosure set forth above regarding similarly identified features thus may not be repeated hereafter. Moreover, specific features of airbag assemblies and related components shown in FIGS. 1A-1D may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 200 and related components depicted in FIGS. 2A-2B. Any suitable combination of the features, and variations of the same, described with respect to the airbag assembly 100 and related components illustrated in FIGS. 1A-1D can be employed with the airbag assembly 200 and related components of FIGS. 2A-2B, and vice versa. This pattern of disclosure applies equally to further embodiments depicted in subsequent figures and described hereafter, wherein the leading digits may be further incremented.

FIG. 2A depicts the airbag assembly 200 in a deployed state, while FIG. 2B depicts the same deployed airbag assembly 200 during occupant 70 loading.

The airbag assembly 200 includes an airbag housing 202, an inflator 204, and an airbag cushion 210. In response to (or in anticipation of) a collision event, the inflator 204 may release inflation gas, causing deployment of the airbag cushion 210 from the housing 202.

Analogous to the airbag cushion 110 discussed above, the airbag cushion 210 may deploy from the housing 202 to adopt a curved configuration. More particularly, in the depicted embodiment, a proximal portion of the airbag cushion 210 may extend upward along the seat back 52 while a distal portion of the airbag cushion 210 extends downward toward the lap of an occupant 70 who is seated in the vehicle occupant position.

The airbag assembly 200 may also include one or more external tethers 230. In the depicted embodiment, a first end 232 of the external tether 230 is attached or otherwise coupled to the airbag cushion 210 adjacent a distal end of the airbag cushion 210. A second end 234 of the external tether 230 is attached or otherwise coupled to a portion of the airbag cushion 210 that is proximal of the distal end of the airbag cushion 210. For example, the second end 234 of the external tether 230 may attach to a proximal portion of the airbag cushion 210. The first end 232 and second end 234 of the external tether 230 are attached to a second surface 214, which is opposite a first surface 212 that is configured to receive a head and torso of the occupant 70. The external tether 230 spans across a space between a proximal portion of the airbag cushion 210 and a distal portion of the airbag cushion. The external tether 230 may limit the size and/or shape of the airbag cushion 210 upon deployment. For example, the external tether 230 may ensure that the airbag cushion 210 adopts a curved or bent configuration upon deployment. More particularly, by limiting the distance between the distal end of the airbag cushion 210 and a region of the airbag cushion 210 that is disposed proximal of the distal end of the airbag cushion 210, the external tether 230 may facilitate or cause the airbag cushion 210 to adopt a curved or bent shape upon deployment.

Figure 3A:
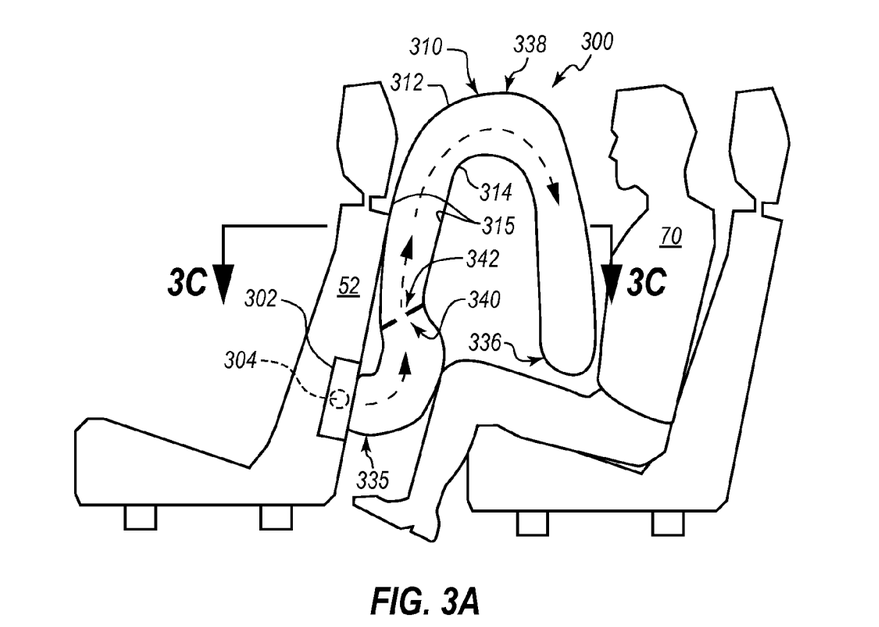
FIG. 3A is a side view of a deployed airbag assembly, according to another embodiment.
Figure 3B:
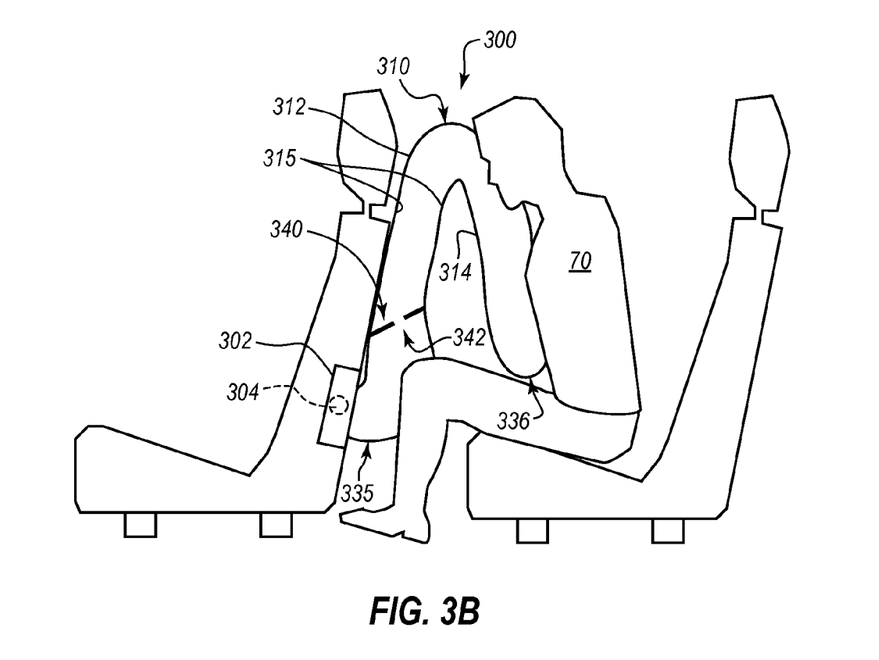
FIG. 3B is a side view of the deployed airbag assembly of FIG. 3A depicting occupant loading onto a deployed airbag.
Figure 3C:
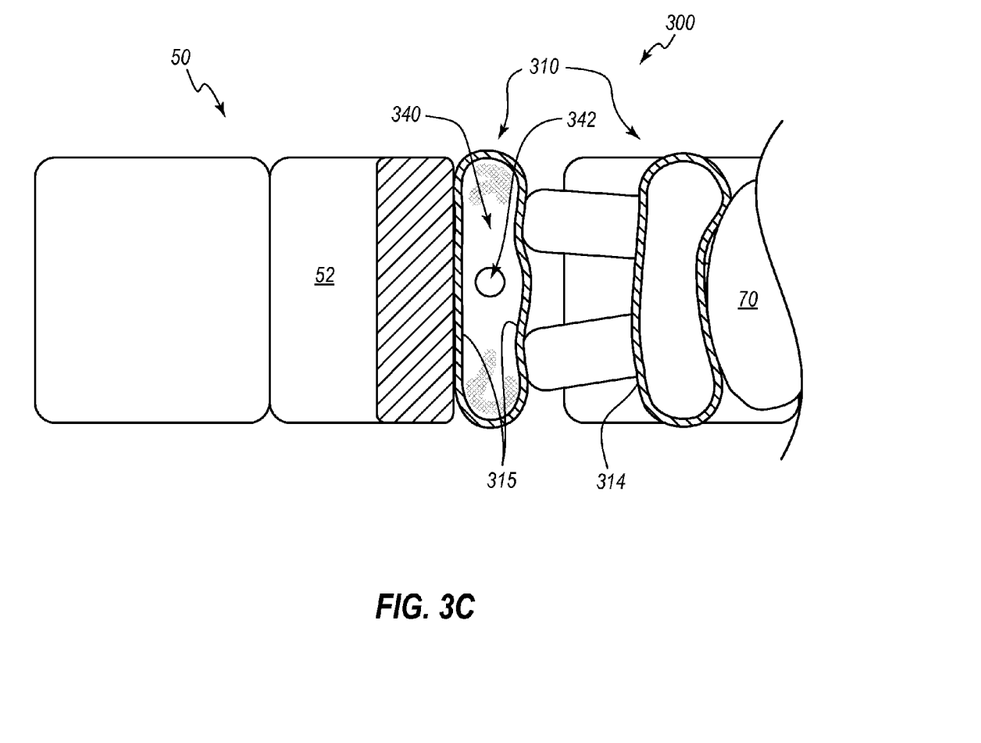
FIG. 3C is a cross-sectional top view of the airbag assembly of FIG. 3A.

FIGS. 3A-3C depict an airbag assembly 300, according to another embodiment. More particularly, FIG. 3A depicts the airbag assembly 300 in a deployed state, while FIG. 3B depicts the same deployed airbag assembly 300 during occupant loading. FIG. 3C provides a cross-sectional view of the airbag assembly 300 through line 3C-3C of FIG. 3A.

The airbag assembly 300 includes an airbag housing 302, an inflator 304, and an airbag cushion 310. In the depicted embodiment, the airbag cushion 310 is configured to deploy from the housing 302 as inflation gas from the inflator 304 is delivered to the airbag cushion 310.

Upon deployment, the airbag cushion 310 adopts a curved configuration. For example, when viewed from the side, the majority of the airbag cushion 310 may appear U-shaped, with a proximal end 335 and a distal end 336 of the airbag cushion 310 being disposed below a middle region 338 of the airbag cushion 310.

The airbag assembly 300 may further include one or more internal tethers 340. The internal tether 340 may be attached to one or more inner surfaces 315 of the airbag cushion 310 to limit the size and/or shape of the airbag cushion 310 upon deployment. For example, in the depicted embodiment, the internal tether 340 is a panel tether that comprises (1) a panel that extends across and connects opposite inner surfaces 315 of the airbag cushion 310 and (2) a vent 342 that allows inflation gas to pass from one side of the tether 340 to the other.

A panel tether may spread loads over larger area (e.g., tether attachment strength/robustness, improved integrity, more stability). A panel tether may also enable adjusting gas flow according to vent quantities, sizes, and locations within the panel tether. A panel tether may enable better control over pressurization of the various portions (chambers) of the cushion (pressure level and timing). Including a one-way vents can enable retaining and/or compartmentalizing inflation gas. For example, a one-way vent may enable the knee restraint portion of the cushion to have higher pressurization to achieve early pelvis restraint, then allow gas to flow into the head/torso portion of the cushion. The one-way valve can then close to prevent back-flow of gas back into knee restraint portion during occupant loading. One-way valves could be a fabric flap that covers the vent hole, a "cinch tube", or other known methods.

In other embodiments, the internal tether may be an elongate strip of material (e.g., string) that extends from one side of the airbag cushion to a substantially opposite side of the airbag cushion. For example, the internal tether may extend between a first surface (e.g., inner surface) of the airbag cushion and a second surface (e.g., inner surface) of the airbag cushion that is disposed opposite of the first surface.

The internal tether 340 may limit the size and/or shape of the airbag cushion 310 upon deployment. For example, the internal tether 340 may limit the distance between opposing surfaces of the airbag cushion 310. The internal tether 340 may also cause the airbag cushion 310 to bend toward a desired (e.g., curved) configuration.

Although the depicted embodiment includes an internal tether, but not an external tether, embodiments that include one or more internal tethers and one or more external tethers are within the scope of this disclosure. For example, in some embodiments, the airbag assembly 300 may further include an external tether (not shown) analogous to the external tether 230 of FIGS. 2A and 2B.

Figure 4A:
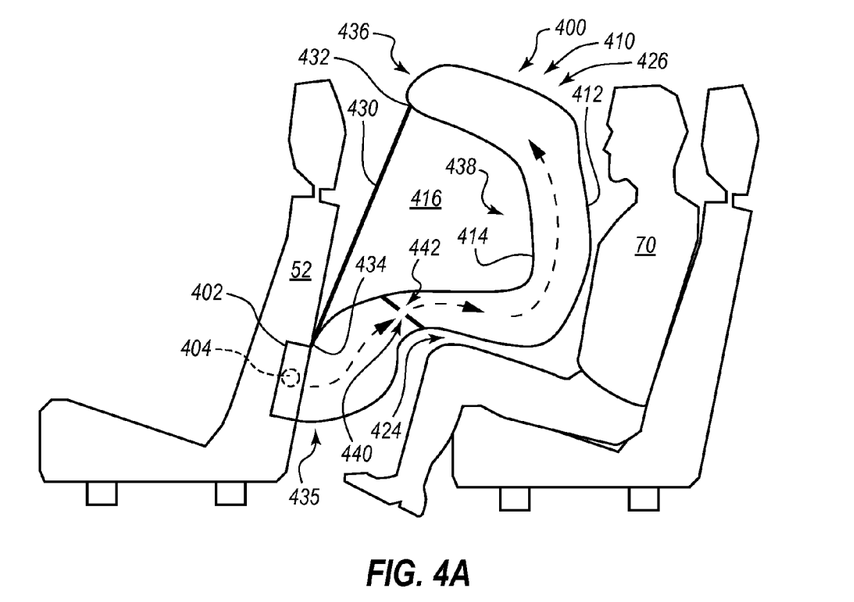
FIG. 4A is a side view of a deployed airbag assembly, according to another embodiment.
Figure 4B:
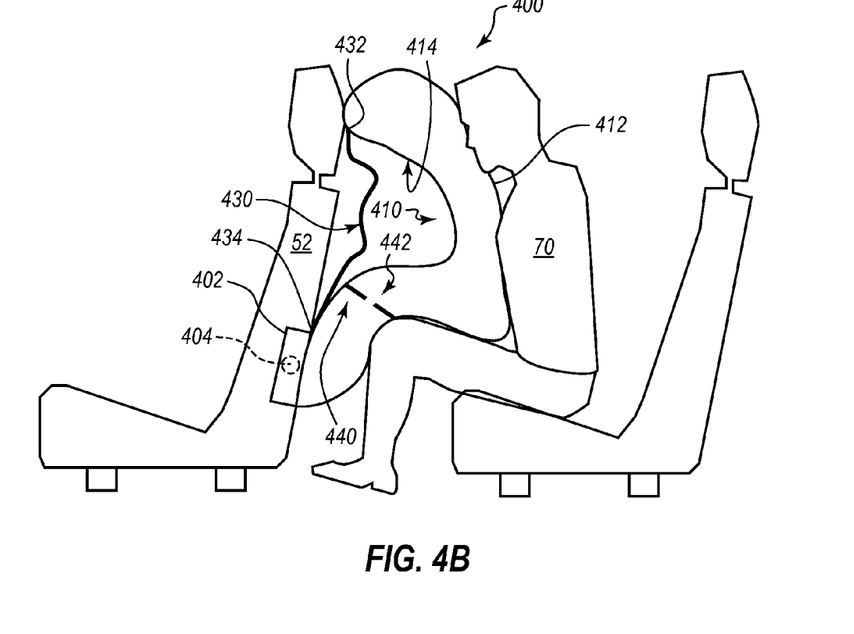
FIG. 4B is a side view of the deployed airbag assembly of FIG. 4A depicting occupant loading onto a deployed airbag.

FIGS. 4A and 4B depict an airbag assembly 400, according to another embodiment. More particularly, FIG. 4A depicts the airbag assembly 400 in a deployed state, while FIG. 4B depicts the same deployed airbag assembly 400 during occupant 70 loading.

The airbag assembly 400 includes an airbag housing 402, an inflator 404, and an airbag cushion 410. In the depicted embodiment, the airbag cushion 410 is configured to deploy from the housing 402 as inflation gas from the inflator 404 is delivered to the airbag cushion 410.

Upon deployment, the airbag cushion 410 adopts a curved configuration different from the configuration depicted in the embodiments depicted in FIGS. 1A-1D, 2A-2B, and 3A-3B. More particularly, the airbag cushion 410, when deployed, is curved such that a proximal portion 424 of the airbag cushion 410 extends toward the torso of an occupant 70 who is seated in the vehicle occupant position, and a distal portion 426 of the airbag cushion 410 extends away from the occupant 70 and toward the seat back 52 (i.e., toward the front of the vehicle). Stated differently, the majority of the airbag cushion 410, when viewed from the side, may appear U-shaped, with a proximal end 435 and a distal end 436 of the airbag cushion 410 being disposed forward of a middle region 438 of the airbag cushion 410. In other words, the inflated airbag cushion 410 may be curved or bent such that a first portion 424 of the airbag cushion 410 extends generally upward and away (toward the occupant 70) from the housing 402 and a second portion 426 of the airbag cushion 410, which is disposed distal of the first portion 424, extends primarily forward relative to the vehicle. In other words, the deployed airbag cushion 410 may be shaped such that a cross-section of the airbag cushion 410 that is parallel to the sagittal plane of the occupant 70 is substantially U-shaped.

The shape of the inflated airbag cushion 410 may be influenced by one or more external tethers 430 of the airbag assembly 400. For example, in the depicted embodiment, the external tether 430 comprises a first end 432 that is attached to the airbag cushion 410 adjacent a distal end of the airbag cushion 410, and a second end 434 that is attached either to the airbag housing 402 or to a portion of the airbag cushion 410 that is disposed adjacent the airbag housing 402. The external tether 430 restricts the movement of the distal end of the airbag cushion 410, causing the airbag cushion 410 to adopt a curved or bent shape. Stated differently, the external tether 430 may prevent the airbag cushion 410 from adopting a conformation in which the distal portion 426 of the airbag cushion 410 is disposed a distance from the housing 402 that is greater than the length of the external tether 430.

The shape of the inflated airbag cushion 410 may also be influenced by one or more internal tethers 440. For example, an internal tether 440 may be attached to one or more inner surfaces of the airbag cushion 410 to limit the size or influence the shape of the airbag cushion 410 upon deployment. In some embodiments, the tether 440 may comprise a vent 442 that allows inflation gas to pass from one side of the tether 440 to the other side of the tether 440. Some airbag assemblies with an airbag cushion shaped similar to that depicted in FIGS. 4A and 4B may lack external or internal tethers (or both).

In the depicted embodiment, a first surface 412 of the airbag cushion 410 is configured to contact and receive both the face of the occupant 70 and one or more knees of the occupant 70 during a collision event. A second surface 414 of the airbag cushion 410 that is disposed opposite the first surface 412 of the airbag cushion 410 contacts neither the head nor the knees of the occupant 70 during a collision event. The second surface 414 doubles over and defines a space 416 or gap between the first (proximal) portion 424 and the second (distal) portion 426.

Figure 5A:
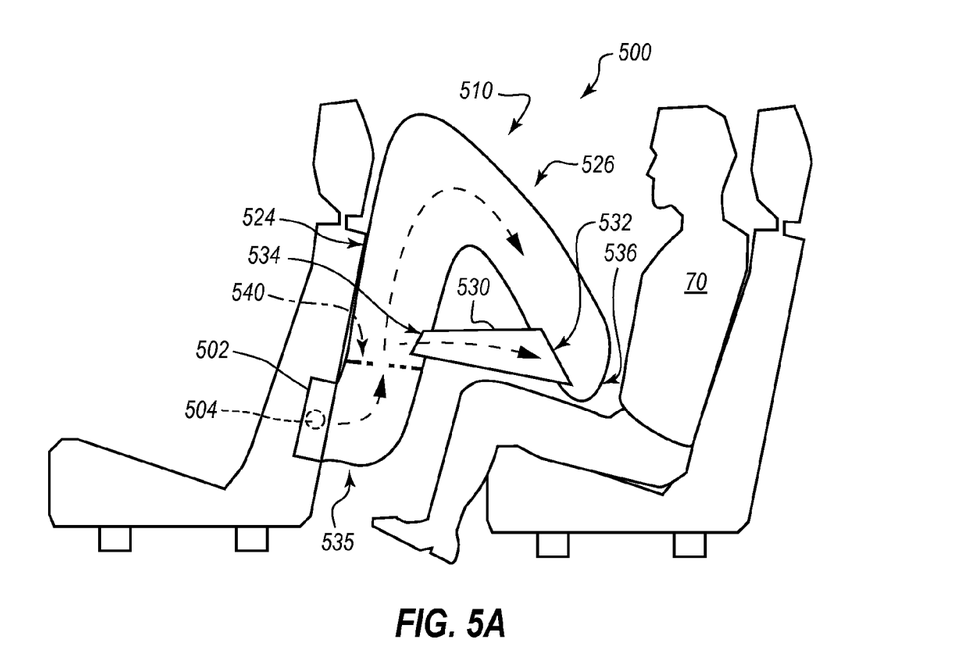
FIG. 5A is a side view of a deployed airbag assembly, according to another embodiment.
Figure 5B:
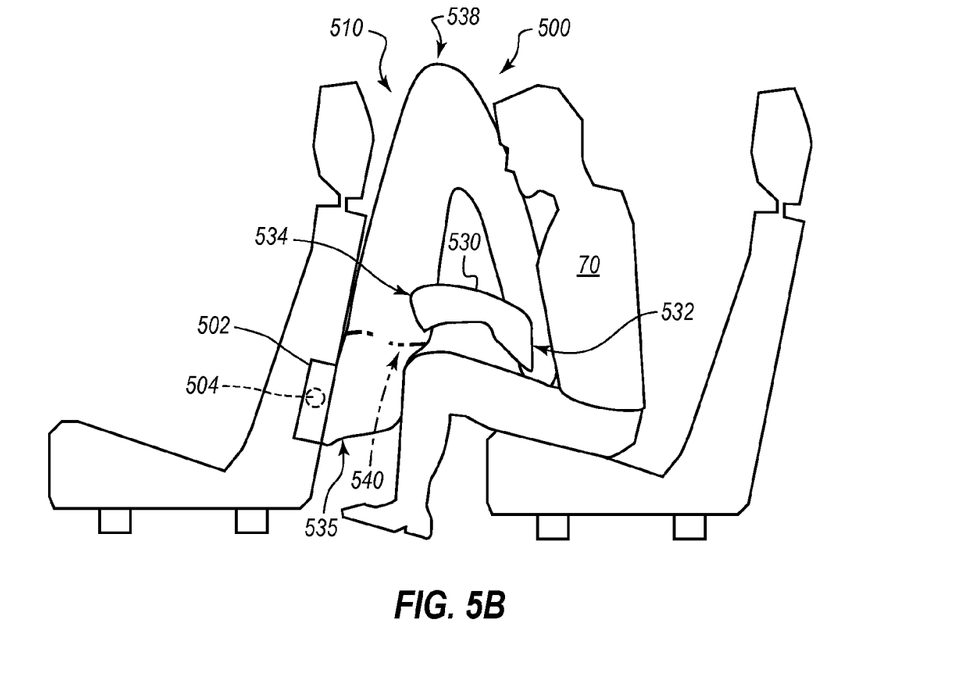
FIG. 5B is a side view of the deployed airbag assembly of FIG. 5A depicting occupant loading onto a deployed airbag.

FIGS. 5A and 5B depict an airbag assembly 500, according to another embodiment. More particularly, FIG. 5A depicts the airbag assembly 500 in a deployed state, while FIG. 5B depicts the same deployed airbag assembly 500 during occupant loading.

The airbag assembly 500 includes an airbag housing 502, an inflator 504, and an airbag cushion 510. In the depicted embodiment, the airbag cushion 510 is configured to deploy from the housing 502 as inflation gas from the inflator 504 is delivered to the airbag cushion 510.

Upon deployment, the airbag cushion 510 adopts a non-linear configuration. For example, the deployed airbag cushion 510 may be shaped such that a cross-section of the airbag cushion 510 that is parallel to the sagittal plane of the occupant 70 (when seated in a vehicle occupant position) is substantially U-shaped. In the depicted embodiment, a majority of the airbag cushion 510, when viewed from the side, appears U-shaped, with the proximal end 535 and the distal end 536 of the airbag cushion 510 being disposed below a middle region 538 of the airbag cushion 510. The airbag cushion 510 includes a proximal portion 524 extends generally upward from the housing 502 and a distal portion 526 that is disposed distal of the first portion 524 and extends primarily downward relative to the vehicle.

The airbag assembly 500 also includes an external tether 530. The external tether 530 includes a first end 532 that is attached to a distal region 526 of the airbag cushion 510 and a second end 534 that is attached to the airbag cushion 510 at a position that is proximal of the distal region 526. For example, the second end 534 is attached to the proximal region 524 of the airbag cushion 510. The external tether 530 may limit the size and/or shape of the airbag cushion 510 upon deployment. For example, the external tether 530 may ensure that the airbag cushion 510 adopts a curved or bent configuration upon deployment.

In the depicted embodiment, the external tether 530 includes an inflatable channel. For example, the tether 530 may be generally tubular in shape, with an aperture at the second (proximal) end 534 that allows inflation gas to enter into the channel of the tether 530 upon deployment. Stated differently, an interior hollow region of the tether 530 may be in fluid communication with the interior of the airbag cushion 510 during deployment. Because, among other things, such an arrangement directs inflation gas toward the torso of the occupant 70, the embodiment depicted in FIGS. 5A and 5B may provide increased resistance to the forward momentum of an occupant 70 during a collision event. The inflatable chamber of the tether 530 may also cause the airbag cushion 510 to more quickly adopt a desired conformation, as the inflatable chamber may improve the stability of the airbag cushion 510.

In some embodiments, the airbag assembly 500 further includes one or more internal tethers 540. Such tether(s) may influence the size and/or shape of the inflated airbag cushion 510.

Figure 6A:
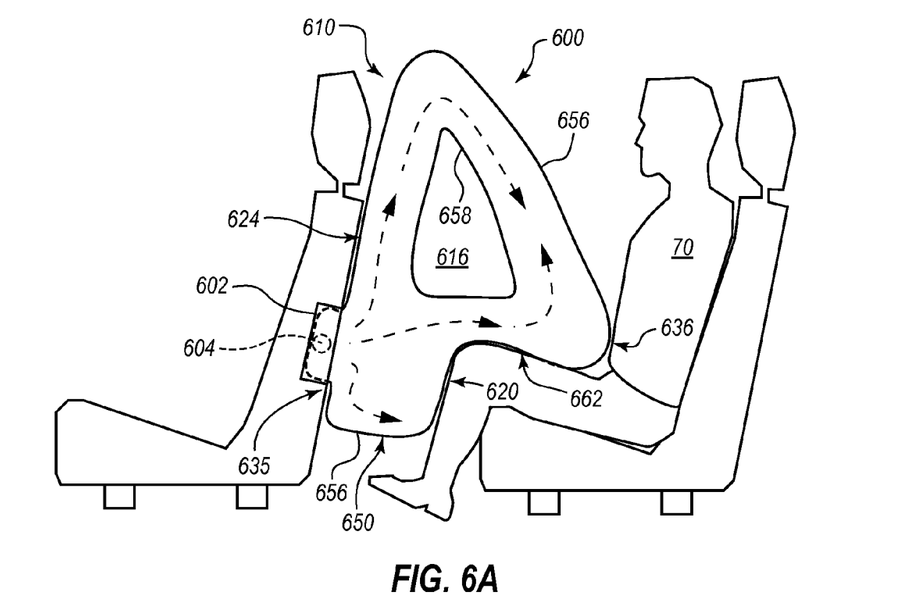
FIG. 6A is a side view of a deployed airbag assembly, according to another embodiment.
Figure 6B:
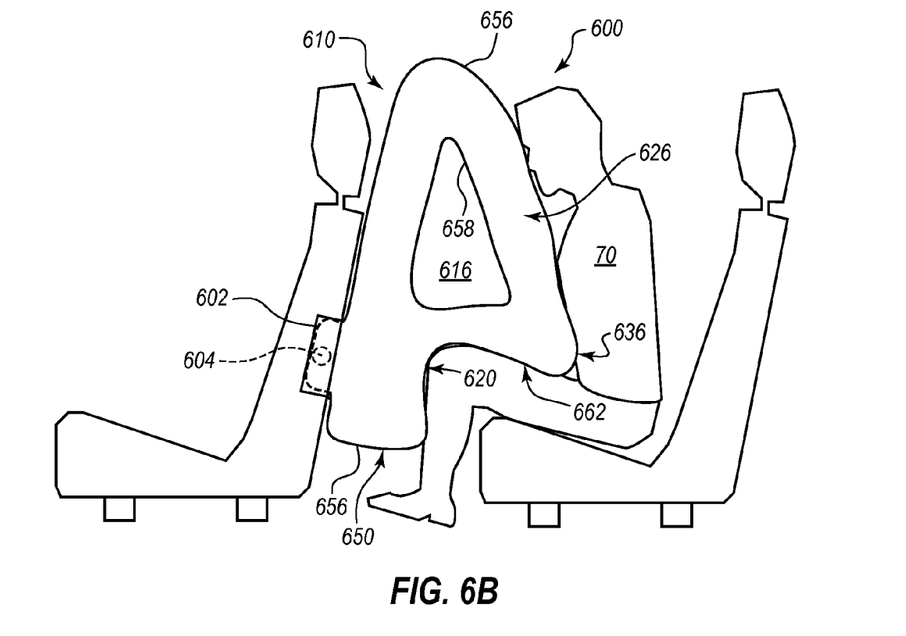
FIG. 6B is a side view of the deployed airbag assembly of FIG. 6A depicting occupant loading onto a deployed airbag.

FIGS. 6A and 6B depict an airbag assembly 600, according to another embodiment. More particularly, FIG. 6A depicts the airbag assembly 600 in a deployed state, while FIG. 6B depicts occupant loading onto the same deployed airbag assembly 600.

The airbag assembly 600 includes an airbag housing 602, an inflator 604, and an airbag cushion 610. In the depicted embodiment, the airbag cushion 610 is configured to deploy from the housing 602 as inflation gas from the inflator 604 is delivered to the airbag cushion 610.

Upon deployment, the airbag cushion 610, when inflated, includes a knee restraint portion 650 that is configured to cushion the knees and/or lower leg of the occupant 70 during a collision event. Stated different, the knee restraint portion 650 of the airbag cushion 610 functions as a knee restraint 620 that provides cushioning to the lower extremities of an occupant 70 during a collision event. The knee restraint portion 650 of the airbag cushion 610 (or a portion of the knee restraint portion 650) may extend downward from the housing 602 in some embodiments.

The housing 602 from which the airbag cushion deploys may be disposed at any suitable position within the seat back 52. For example, in the depicted embodiment, the airbag cushion 610 and the inflator 602 are disposed level with the knees of the occupant 70 when the occupant 70 is seated in the vehicle occupant position as depicted in FIG. 6A. In other embodiments, the housing 602 is disposed at a position that is lower than the position of the knees of the occupant 70. In still other embodiments, the housing 602 is mounted or otherwise disposed at a position that is higher than the position of the knees of the occupant 70. The inflator 604 may likewise be disposed level with, below, or above the knees of the occupant 70 when the occupant 70 is seated in the vehicle occupant position.

The airbag cushion 610, when inflated, adopts a curved or bent shape. More particularly, in the depicted embodiment, the airbag cushion 610, when viewed from the side, forms a loop shape with an empty space 616 disposed inside of the loop. Stated differently, the cross-section at the of the airbag cushion 610 defined by the intersection of the sagittal plane of the occupant (when the occupant is in the vehicle occupant position) with the airbag cushion 610 includes a loop. For example, in some embodiments, the airbag cushion 610, when viewed from the side, is substantially P-shaped. The airbag cushion 610, and specifically the P-shape of the airbag cushion 610, includes a U-shape with a proximal portion 624 extending generally upward from the housing 602 and a distal portion 626 that extends primarily downward relative to the vehicle. The U-shape is closed to the P-shape by a lap portion 662 that extends from the proximal portion 624 to the distal portion 626. For example, the lap portion 662 may extend from a distal end 636 of the airbag cushion 610 to a proximal end 635 of the airbag cushion 610.

In the depicted embodiment, the airbag cushion 610 includes an outermost exterior surface 656 that is configured to receive and, thereby cushion, both the head and knees of the occupant 70 during a collision event. The outermost exterior surface 656 of the illustrated embodiment of FIGS. 6A and 6B extends along the knee restraint portion 650, the lap portion 662, the distal portion 626, and the proximal portion 624. The airbag cushion 610 also includes an innermost exterior surface 658 that defines the size and shape of the empty space 616 formed by the loop-shaped airbag cushion 610. The innermost exterior surface 658 of the illustrated embodiment of FIGS. 6A and 6B extends along the lap portion 662, the distal portion 626, and the proximal portion 624. In some embodiments, the distance from any point on the outermost exterior surface 656 to the nearest point on the innermost exterior surface is no more than 20 cm. In some embodiments, the distance from any point on the outermost exterior surface 656 to the nearest point on the innermost exterior surface is between 15 cm and 20 cm. In some embodiments, the distance from any point on the outermost exterior surface 656 to the nearest point on the innermost exterior surface is between 16 cm and 19 cm. In some embodiments, the distance from any point on the outermost exterior surface 656 to the nearest point on the innermost exterior surface is between 17 cm and 18 cm.

Because the arrangement depicted in FIGS. 6A and 6B directs inflation gas toward the torso of the occupant 70, the embodiment depicted in FIGS. 6A and 6B may provide increased resistance to the forward momentum of an occupant 70 during a collision event relative to the embodiments depicted in FIGS. 1A-4B. The arrangement depicted in FIGS. 6A and 6B may also improve the stability of the airbag cushion 610 and/or cause the airbag cushion 610 to more quickly adopt a preferred conformation relative to the embodiments depicted in FIGS. 1A-4B.

Figure 7A:
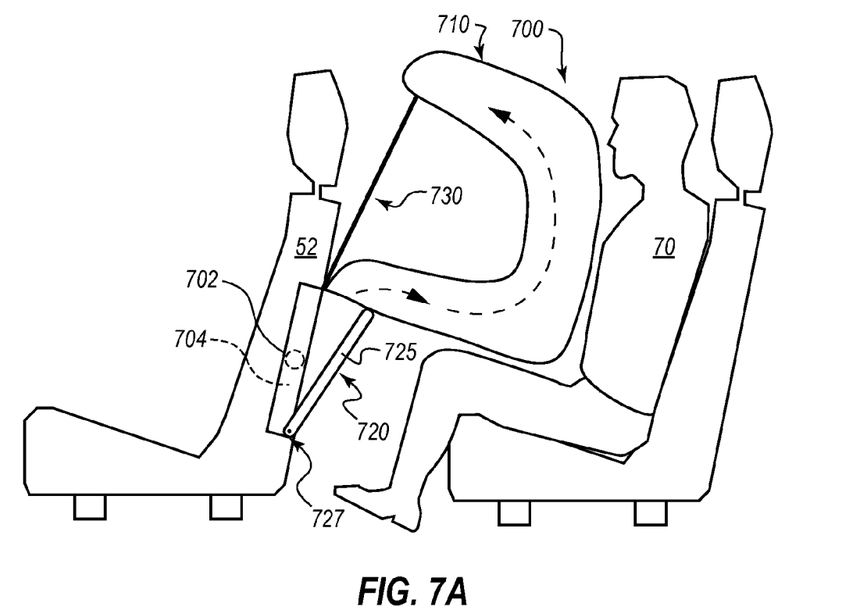
FIG. 7A is a side view of a deployed airbag assembly, according to another embodiment.
Figure 7B:
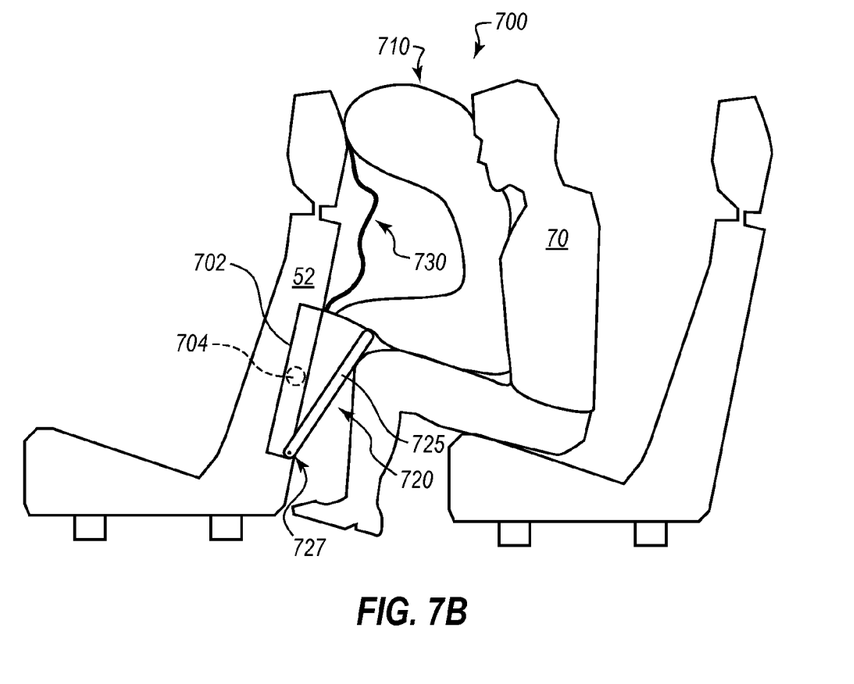
FIG. 7B is a side view of the deployed airbag assembly of FIG. 7A depicting occupant loading onto a deployed airbag.

FIGS. 7A and 7B depict an airbag assembly 700, according to another embodiment. More particularly, FIG. 7A depicts the airbag assembly 700 in a deployed state, while FIG. 7B depicts occupant 70 loading onto the same deployed airbag assembly 700.

The airbag assembly 700 includes an airbag housing 702, an inflator 704, and an airbag cushion 710. In the depicted embodiment, the airbag cushion 710 is configured to deploy from the housing 702 as inflation gas from the inflator 704 is delivered to the airbag cushion 710.

Upon deployment, the airbag cushion 710 adopts a curved configuration similar to that described above in connection with the embodiment shown in FIGS. 4A and 4B. More particularly, the airbag cushion 710, when deployed, is curved such that a proximal portion of the airbag cushion 710 extends toward the torso of an occupant 70 who is seated in the vehicle occupant position, and a distal portion of the airbag cushion 710 extends away from the occupant 70 and toward the seat back 52 (i.e., toward the front of the vehicle). Stated differently, the majority of the airbag cushion 710, when viewed from the side, may appear U-shaped, with the proximal and distal ends of the airbag cushion 710 being disposed forward of a middle region of the airbag cushion 710.

The airbag assembly 700 also includes an external tether 730. The external tether 730 restricts the movement of the distal end of the airbag cushion 710, causing the airbag cushion 710 to adopt a curved or bent configuration.

The airbag assembly 700 also includes a knee restraint 720 that is configured to deploy toward one or more knees of the occupant 70 as a result of deployment of the airbag cushion 710 during a collision event. The knee restraint 720 includes a panel 725 that is configured to be pushed toward one or more knees of the occupant 70 by the airbag cushion 710 as the airbag cushion 610 is inflated. More particularly, in the depicted embodiment, the panel 725 is configured to pivot about a hinge 727 as the panel is pushed toward one or more knees of the occupant 70 during a collision event. The panel 725 may comprise and/or be formed from metal, plastic, and/or composite. The panel 725 may function as an airbag cover and/or trim for the seat back 52.

A knee restraint that includes a panel 725, such as the knee restraint 720, may distribute the forward energy of an occupant 70 more broadly and/or efficiently than knee restraints that lack such a panel 725. For example, when the knees and/or lower leg of an occupant 70 contact the panel 725, the panel 725 may distribute the forward energy of the occupant 70 across a larger region of the airbag cushion 710 than when the occupant's knees directly strike a knee restraint without a panel (e.g., a portion of an airbag cushion), such as that depicted in FIGS. 4A and 4B. Accordingly, in some embodiments, an airbag cushion 710 that causes deployment of the knee restraint 720 may effectively cushion the lower legs of an occupant 70 when filled to a lower pressure than would be needed to effectively cushion the lower legs of the occupant 70 if the knee restraint 720 lacked the panel 725.

In some embodiments, the airbag cushion 710 is attached to both the airbag housing 702 and the panel 725, thereby limiting the extent to which the panel 725 may rotate toward one or more knees of the occupant 70. In other embodiments, the airbag cushion 710 is attached to the housing 702, but not to the panel 725. In such embodiments, a separate tether (not shown) that connects the airbag housing 702 to the panel 725 may be used to limit rotation of the panel 725.

In still other embodiments, the knee restraint 720 may include a drawer that opens or extends toward the knees of the occupant.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

The invention claimed is:

1. An airbag assembly comprising:
   an airbag housing that is configured to be disposed within or adjacent to a seat back of a seat in a vehicle;
   an inflator;
   an airbag cushion that is deployable from the airbag housing to cushion at least one of a head and a torso of a back-seat occupant seated in a vehicle occupant position in a back seat of the vehicle during a collision event, wherein the airbag cushion is configured to receive inflation gas from the inflator to transition from a compact un-deployed state to an expanded deployed state in which the airbag cushion adopts a curved or bent shape such that a cross-section of the airbag cushion includes a substantially U-shape, the cross-section to be parallel to the sagittal plane of the back-seat occupant when the back-seat occupant is seated in the vehicle occupant position in the back seat of the vehicle; and
   a knee restraint that is configured to deploy to cushion one or more knees of the back-seat occupant when the back-seat occupant is seated in the vehicle occupant position in the back seat of the vehicle as a result of deployment of the airbag cushion during the collision event.

2. The airbag assembly of claim 1, wherein the airbag housing is disposed at a position that is level with or lower than the position of the one or more knees of the back-seat occupant when the back-seat occupant is seated in the vehicle occupant position.

3. The airbag assembly of claim 1, wherein the knee restraint is a portion of the airbag cushion.

4. The airbag assembly of claim 1, wherein the knee restraint comprises a panel that is configured to be pushed by the airbag cushion as the airbag cushion is inflated toward the one or more knees of the back-seat occupant when the back-seat occupant is seated in the vehicle occupant position.

5. The airbag assembly of claim 4, wherein the panel is configured to pivot about a hinge as the panel is pushed toward the one or more knees of the back-seat occupant when the occupant is seated in the vehicle occupant position.

6. The airbag assembly of claim 1, further comprising one or more tethers.

7. The airbag assembly of claim 6, wherein the one or more tethers comprise a first external tether, wherein:
   a first end of the first external tether is attached to the airbag cushion adjacent a distal end of the airbag cushion; and
   a second end of the first external tether is attached to one or more of the airbag housing and a portion of the airbag cushion disposed proximal to the distal end of the airbag cushion.

8. The airbag assembly of claim 6, wherein the one or more tethers comprise an internal tether, wherein the ends of the internal tether are attached to one or more inner surfaces of the airbag cushion to limit one or more of the size and shape of the airbag cushion upon deployment.

9. The airbag assembly of claim 1, wherein the airbag cushion, when deployed, is curved such that a proximal portion of the airbag cushion extends upward along the seat back and a distal portion of the airbag cushion extends downward toward the lap of the back-seat occupant when the back-seat occupant is seated in the vehicle occupant position.

10. The airbag assembly of claim 1, wherein the airbag cushion comprises:
    a first surface that is configured to receive during the collision event the head and the torso of the back-seat occupant during the collision event, the first surface extending from adjacent the housing to a distal end of the airbag cushion when the airbag cushion is fully inflated; and
    a second surface that is disposed opposite of the first surface, the second surface extending from adjacent the housing to the distal end of the airbag cushion when the airbag cushion is fully inflated;
    wherein any point on the first surface is disposed no more than 20 centimeters from a point on the second surface when the airbag cushion is fully inflated.

11. An airbag assembly comprising:
    an airbag housing that is configured to be mounted within a seat back of a seat of a vehicle;
    an inflator;
    an airbag cushion that is configured to receive inflation gas from the inflator to deploy from the airbag housing at a position that is level with or lower than the position of a knee of a back-seat occupant when the back-seat occupant is seated in the vehicle occupant position, wherein the airbag cushion comprises:
        a first surface that is configured to receive one or more of a head and a torso of the back-seat occupant during a collision event, the first surface extending from adjacent the airbag housing to curve back on itself to a distal end of the airbag cushion when the airbag cushion is fully inflated; and
        a second surface that is disposed opposite of the first surface, the second surface forming an empty space between a proximal portion of the airbag cushion and a distal portion of the airbag cushion.

12. The airbag assembly of claim 11, wherein the second surface of the airbag cushion extends from adjacent the housing to curve back on itself to the distal end of the airbag cushion when the airbag cushion is fully inflated.

13. The airbag assembly of claim 11, wherein the airbag cushion is configured to extend from at or below knees of the back-seat occupant to receive legs of the back-seat occupant during the collision event.

14. The airbag assembly of claim 12, wherein the second surface is configured to receive one or more knees of the back-seat occupant during the collision event.

15. The airbag assembly of claim 11, wherein the airbag cushion, when fully inflated, comprises a first portion that extends generally upward from the housing and a second portion disposed distal of the first portion that extends primarily downward relative to the vehicle.

16. The airbag assembly of claim 15, wherein the airbag cushion, when fully inflated, comprises a lap portion configured to extend over a lap of the back-seat occupant and between the second portion and the first portion of the airbag cushion.

17. An airbag that is configured to receive inflation gas from an inflator to expand from a compact state to deploy from an airbag housing to an expanded deployed state, wherein the airbag comprises:
    a proximal portion that, in the deployed state, extends in an upward direction from the housing to extend along a reaction surface in a vehicle;
    a distal portion that, in the deployed state, extends downward and away from a distal end of the proximal portion and toward a lap of an occupant when the occupant is seated in a vehicle occupant position in a seat of a vehicle, wherein the distal portion is configured to receive and cushion one or more of a head and a torso of the occupant during a collision event; and a lap portion that, in the deployed state, extends over a lap of the occupant and between the proximal portion and the distal portion of the airbag cushion when the occupant is seated in the vehicle occupant position; and a knee restraint portion to cushion one or more knees of the occupant during a collision event, wherein the knee restraint portion, in the deployed state, is disposed below the lap portion and the proximal portion to be positioned in front of one or more knees of the occupant;

wherein the proximal portion, the distal portion, and the lap portion of the airbag cushion are in fluid communication to form a single inflatable chamber that, in the deployed state, forms a loop that defines an empty space between the proximal portion, the distal portion and the lap portion.

18. The airbag of claim 17, wherein the airbag is configured to deploy from the airbag housing mounted at a seat back of a seat in a vehicle to cushion the occupant when the occupant is seated in the vehicle occupant position of a back seat, and wherein the reaction surface is the seat back.

19. The airbag of claim 17, wherein the airbag is configured to deploy from the airbag housing mounted at a position that is level with or lower than a position of one or more knees of the occupant when the occupant is seated in the vehicle occupant position.

20. The airbag of claim 17, wherein the knee restraint portion of the airbag deploys from the airbag housing mounted at a position that is level with or lower than a position of the one or more knees of the occupant to extend toward the occupant and upward, wherein the proximal portion and the lap portion deploy from the knee restraint portion.

21. The airbag of claim 17, wherein the knee restraint portion of the airbag deploys from the airbag housing mounted at a position that is above a position of the one or more knees of the occupant to extend toward the occupant and downward from the airbag housing to be positioned in front of one or more knees of the occupant.

* * * * *